United States Patent
Cao et al.

(10) Patent No.: US 10,878,451 B2
(45) Date of Patent: Dec. 29, 2020

(54) CHANGE POINT DETECTION IN A MULTI-ARMED BANDIT RECOMMENDATION SYSTEM

(71) Applicant: Adobe Inc., San Jose, CA (US)

(72) Inventors: Yang Cao, Daly City, CA (US); Zheng Wen, Fremont, CA (US); Branislav Kveton, San Jose, CA (US)

(73) Assignee: Adobe Inc., San Jose, CA (US)

( * ) Notice: Subject to any disclaimer, the term of this patent is extended or adjusted under 35 U.S.C. 154(b) by 221 days.

(21) Appl. No.: 16/121,450

(22) Filed: Sep. 4, 2018

(65) Prior Publication Data

US 2020/0074504 A1    Mar. 5, 2020

(51) Int. Cl.
  *G06Q 30/02* (2012.01)
  *G06N 7/00* (2006.01)
(52) U.S. Cl.
  CPC ......... *G06Q 30/0254* (2013.01); *G06N 7/005* (2013.01)
(58) Field of Classification Search
  CPC .................................................. G06Q 30/02
  See application file for complete search history.

(56) References Cited

U.S. PATENT DOCUMENTS

| 9,129,214 B1* | 9/2015 | Gomez-Uribe | G06N 5/02 |
| 10,360,508 B1* | 7/2019 | Gomez-Uribe | G06N 5/02 |
| 10,511,481 B1* | 12/2019 | Castellanos | G06F 8/61 |
| 2015/0012345 A1* | 1/2015 | Bhagat | G06Q 30/02 |
| | | | 705/14.16 |
| 2017/0278114 A1* | 9/2017 | Renders | G06Q 30/0282 |
| 2020/0019871 A1* | 1/2020 | Balakrishnan | G06N 5/045 |

OTHER PUBLICATIONS

Atan, Onur, Bandit Framework for Systematic Learning in Wireless Video based Face Recognition, University of California, Los Angeles, Pro Quest Dissertations Publishing, 2014. 1571125. 60 pages, (Year: 2014).*

Allesiardo,"EXP3 with Drift Detection for the Switching Bandit Problem", In Data Science and Advanced Analytics (DSAA), 2015., Oct. 2015, 7 pages.

Auer,"Finite-time Analysis of the Multiarmed Bandit Problem", May 2002, 22 pages.

Auer,"The Nonstochastic Multiarmed Bandit Problem", Nov. 18, 2001, pp. 48-77.

Auer,"Using Confidence Bounds for Exploitation-Exploration Trade-offs", Journal of Machine Learning Research, Nov. 2002, 26 pages.

(Continued)

*Primary Examiner* — Marilyn G Macasiano
(74) *Attorney, Agent, or Firm* — SBMC

(57) ABSTRACT

Recommendation systems and techniques are described that employ change point detection to generate recommendations for digital content. In one example, a change point detection technique is employed by a recommendation system to identify when a change point has occurred at a respective time step of a series of time steps. Detection of this change point may then be used by the recommendation system to reset the statistical model to address this change as well as generate a subsequent recommendation configured for exploration of reward distributions of the items of digital marketing content.

20 Claims, 6 Drawing Sheets

(56) References Cited

OTHER PUBLICATIONS

Basseville,"Detection of Abrupt Changes: Theory and Application", Prentice Hall Englewood Cliffs, 1993., 469 pages.
Besbes,"Optimal Exploration-Exploitation in a Multi-Armed-Bandit Problem with Non-stationary Rewards", In Advances in neural information processing systems, May 13, 2014, 20 pages.
Bouneffouf,"A Contextual-bandit Algorithm for Mobile Context-Aware Recommender System", In International Conference on Neural Information Processing, Nov. 12, 2012, 8 pages.
Cesa-Bianchi,"Prediction, learning, and games", Cambridge university press, 2006, 403 pages.
Chu,"A Case Study of Behavior-driven Conjoint Analysis on Yahoo! Front Page Today Module", In Proceedings of the 15th ACM SIGKDD international conference on Knowledge discovery and data mining, Jul. 1, 2009, 8 pages.
Garivier,"On Upper-Confidence Bound Policies for Non-Stationary Bandit Problems", May 22, 2008, 24 pages.
Girgin,"Managing advertising campaigns—an approximate planning approach", Nov. 8, 2012, 23 pages.
Hartland,"Change Point Detection and Meta-Bandits for Online Learning in Dynamic Environments", Nov. 5, 2007, 16 pages.
Herbster,"Tracking the Best Expert", Machine Learning, vol. 32, Issue 2, Aug. 1998, pp. 151-178.
Kocsis,"Discounted UCB", in 2nd PASCAL Challenges Workshop, 2006, Apr. 2006, 12 pages.
Kveton,"Matroid Bandits: Fast Combinatorial Optimization with Learning", Jun. 16, 2014, 12 pages.
Lai,"Asymptotically Efficient Adaptive Allocation Rules", Advances in applied mathematics, 6(1):4-22, Mar. 1985, 19 pages.
Lai,"Sequential Change-Point Detection When the Pre- and Post-Change Parameters are Unknown", May 2010, pp. 162-175.
Li,"Unbiased Offline Evaluation of Contextual Bandit Algorithms with Generalized Linear Models", In Proceedings of the fourth ACM international conference on Web search and data mining, Mar. 1, 2012, 18 pages.
Littlestone,"The Weighted Majority Algorithm", Oct. 26, 1992, 39 pages.
Mellor,"Thompson Sampling in Switching Environments with Bayesian Online Change Point Detection", In Proceedings of the Sixteenth International Conference on Artificial Intelligence and Statistics, Feb. 18, 2013, 17 pages.
Schwartz,"Customer Acquisition via Display Advertising Using Multi-Armed Bandit Experiments", Mar. 2016, 68 pages.
Vermorel,"Multi-Armed Bandit Algorithms and Empirical Evaluation", In ECML, vol. 3720, Oct. 2005, 12 pages.
Villar,"Multi-armed Bandit Models for the Optimal Design of Clinical Trials: Benefits and Challenges", Statistical science: a review journal of the Institute of Mathematical Statistics, Jul. 29, 2015, 18 pages.
Willsky,"A Generalized Likelihood Ratio Approach to the Detection and Estimation of Jumps in Linear Systems", Feb. 1976, 8 pages.
Yu,"Piecewise-stationary Bandit Problems with Side Observations", In Proceedings of the 26th Annual International Conference on Machine Learning, Jun. 14, 2009, 8 pages.

\* cited by examiner

Algorithm 1 $\text{CD}(w, b, Y_1, \ldots, Y_w)$

Require: An even number $w$, $w$ observations $Y_1, \ldots, Y_w$ and a prescribed threshold $b > 0$ 1: if $|\sum_{i=w/2+1}^{w} Y_i - \sum_{i=1}^{w/2} Y_i| > b$ then
2:     Return True
3: else
4:     Return False
5: end if

Algorithm 2 Monitored UCB (M-UCB)

Require: $T, K$, even integer $w > 0, b > 0$ and $\gamma \in [0, 1]$
1: Initialization: $\tau \leftarrow 0$ and $n_k \leftarrow 0 \; \forall k \in \mathcal{K}$
2: for all $t = 1, 2, \ldots, T$ do
3:     $A \leftarrow (t - \tau) \bmod \lfloor K/\gamma \rfloor$.
4:     if $A \leq K$ then
5:         $A_t \leftarrow A$.
6:     else
7:         for all $k = 1, \ldots, K$ do
8:             $\text{UCB}_k \leftarrow \frac{1}{n_k} \sum_{n=1}^{n_k} Z_{k,n} + \sqrt{\frac{2 \log(t - \tau)}{n_k}}$.
9:         end for
10:        $A_t \leftarrow argmax_{k \in \mathcal{K}} \text{UCB}_k$.
11:     end if
12:     Play arm $A_t$ and receive the reward $X_{A_t, t}$.
13:     $n_{A_t} \leftarrow n_{A_t} + 1; Z_{A_t, n_{A_t}} \leftarrow X_{A_t, t}$.
14:     if $n_{A_t} \geq w$ then
15:         if $CD(w, b, Z_{A_t, n_{A_t} - w + 1}, \ldots, Z_{A_t, n_{A_t}}) = $ True then
16:             $\tau \leftarrow t$ and $n_k \leftarrow 0 \; \forall k \in \mathcal{K}$.
17:         end if
18:     end if
19: end for

*Fig. 5*

CHANGE POINT DETECTION IN A MULTI-ARMED BANDIT RECOMMENDATION SYSTEM

BACKGROUND

Recommendation systems are used to guide user interaction and navigation with digital content via a computing device using recommendations. Examples of recommendations include which article to read by a user, which advertisement to include in a webpage, digital movies for viewing, and so forth. In order to do so, recommendation systems are configured to generate a recommendation in a manner to cause a user, after exposure to the recommendation, to perform a desired user interaction. The recommendation, for instance, may point to the user to a particular article that might be of interest, cause conversion of a good or service by exposure to digital marketing content, cause a user to watch a recommended digital movie, and so forth.

One example of a technique used by a recommendation system to generate recommendations is referred to as a multi-armed bandit (MAB). This technique is configured to address allocation of a fixed set of resources (e.g., digital content) through use of recommendations in a way to cause a desired user interaction. In this technique, the recommendation system is modeled to determine which option in a collection of options to recommend (e.g., an advertisement), how many times to recommend each option, in which order to provide the options, and so forth. As part of this, the desired user action is considered as a "reward" that is received in response to exposure to the recommendation, e.g., the goal of the user exposure to the recommendation such as to read the article, watch a movie, and so forth. Accordingly, each of the options is modeled using a statistical model to have a corresponding reward distribution describing a likelihood of receiving the reward, an amount of the reward, and so forth.

The recommendation system generates recommendations to maximize an overall amount of reward over a series of time steps. This is performed by the recommendation system by learning about the reward distributions (e.g., exploration) and collecting the rewards (e.g., exploitation) based on this learned knowledge. In exploration techniques, for instance, recommendations are generated to gather data regarding the reward distributions for respective options, e.g., effects of particular items of content on achieving a desired user interaction. The recommendation system also employs exploitation techniques to maximize a reward at a respective time step for a recommendation. In this way, the recommendation system may "learn" about the reward distributions of respective items of digital content through exploration and maximize the amount of rewards collected at the individual time steps through exploitation. Both of these techniques are thus employed to maximize an overall amount of reward over the series of time steps through learning about the rewards and collecting the rewards based on this learned knowledge as described by respective reward distributions.

Conventional multi-armed bandit techniques focus on two standard models. In a first such example, an adversarial bandit model is used in which each option (e.g., K arm in MAB) of the plurality of options has a time-invariant reward distribution. Thus, this model assumes that the reward distributions do not vary over time. On the other hand, a stochastic bandit model assumes that a reward distribution of each option of the plurality of options changes at each of the time steps.

In real world scenarios, however, neither of these standard models are accurate. Specifically, reward distributions do vary with time in real world scenarios and thus depart from conventional stochastic bandit models. However, this variance is less frequent than what is typically assumed by conventional stochastic bandit models. As described above, for instance, each item of digital content is modeled as an option and users' clicks are modeled as the desired user interaction, i.e., the "rewards." In real world scenarios, a user's click probability on an item is unlikely to be time-invariant overall, i.e., it is likely to change at some point. However, the user's click probably is also unlikely to change significantly at each of the time steps. As a result, an adversarial bandit model may over represent changes at the time steps and thus result in inefficient use of computational resources. On the other hand, a stochastic bandit model may under represent these changes in real world scenarios and thus lack accuracy and therefore fail for its intended purpose. Similar situations arise in dynamic pricing systems and investment option selection. Thus, these conventional techniques lack accuracy and fail for their intended purpose by either over representing or under representing changes. This results in inefficient use of computational resources as well as inefficient use of the limited amount of resources, for which, these techniques are configured to address, e.g., limited resources to provide digital marketing content to cause conversion of a good or service.

SUMMARY

Recommendation systems and techniques are described that employ change point detection to generate recommendations for digital content. These techniques overcome the limitations and lack of accuracy of conventional recommendation systems that employ adversarial bandit models or stochastic bandit models, solely. This is performed by accurately addressing an amount of change observed in real world scenarios through change point detection.

In one example of change point detection, a recommendation system is configured to employ a statistical model in which reward distributions for respective items of digital content (i.e., the "arms" in MAB) are considered to be piecewise constant at individual time steps. However, the recommendation system is also configured to address a shift at some unknown time step in the future, which is referred to as a "change point." In this way, the change point detection techniques support a middle ground between standard adversarial and stochastic models that over or under represent changes to reward distributions used to generate a recommendation.

The recommendation system, in one example, begins by generating a statistical model, e.g., through logical regression, that includes reward distributions for each of a plurality of items of digital content based on user interaction data. The user interaction data, for instance, may describe user actions initiated in response to exposure to digital content, e.g., conversion caused by digital marketing content. The statistical model is then employed by the recommendation system to generate recommendations to maximize an overall reward over a series of time steps, e.g., using exploration or exploitation as described above.

A change point detection technique is also employed by the recommendation system to identify when a change point has occurred at a respective time step of a series of time steps. Detection of this change point may then be used by the recommendation system to regenerate the statistical model to address this change as well as generate a subsequent recommendation configured for exploration of reward distributions of the items of digital marketing content.

Detection of the change point may be performed in a variety of ways by the recommendation system. In one example, the change point is detected by the recommendation system based at on a determination that a reward distribution for the item of digital content that is subject to a recommendation departs from a reward distribution of the statistical model for the item of digital content by at least a threshold amount. The change point, for instance, may be detected by the recommendation system by monitoring an empirical mean of a respective reward distribution for an item of digital content that corresponds to the digital content recommendation. As a result, the recommendation system may react efficiently to changes in reward distributions used to generate a recommendation without suffering from inaccuracies caused by over or under representation of changes as encountered in real world examples involving adversarial or stochastic models.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 5 depicts a second example algorithm as part of a multi-armed bandit recommendation system.

DETAILED DESCRIPTION

Overview

Figure 1:
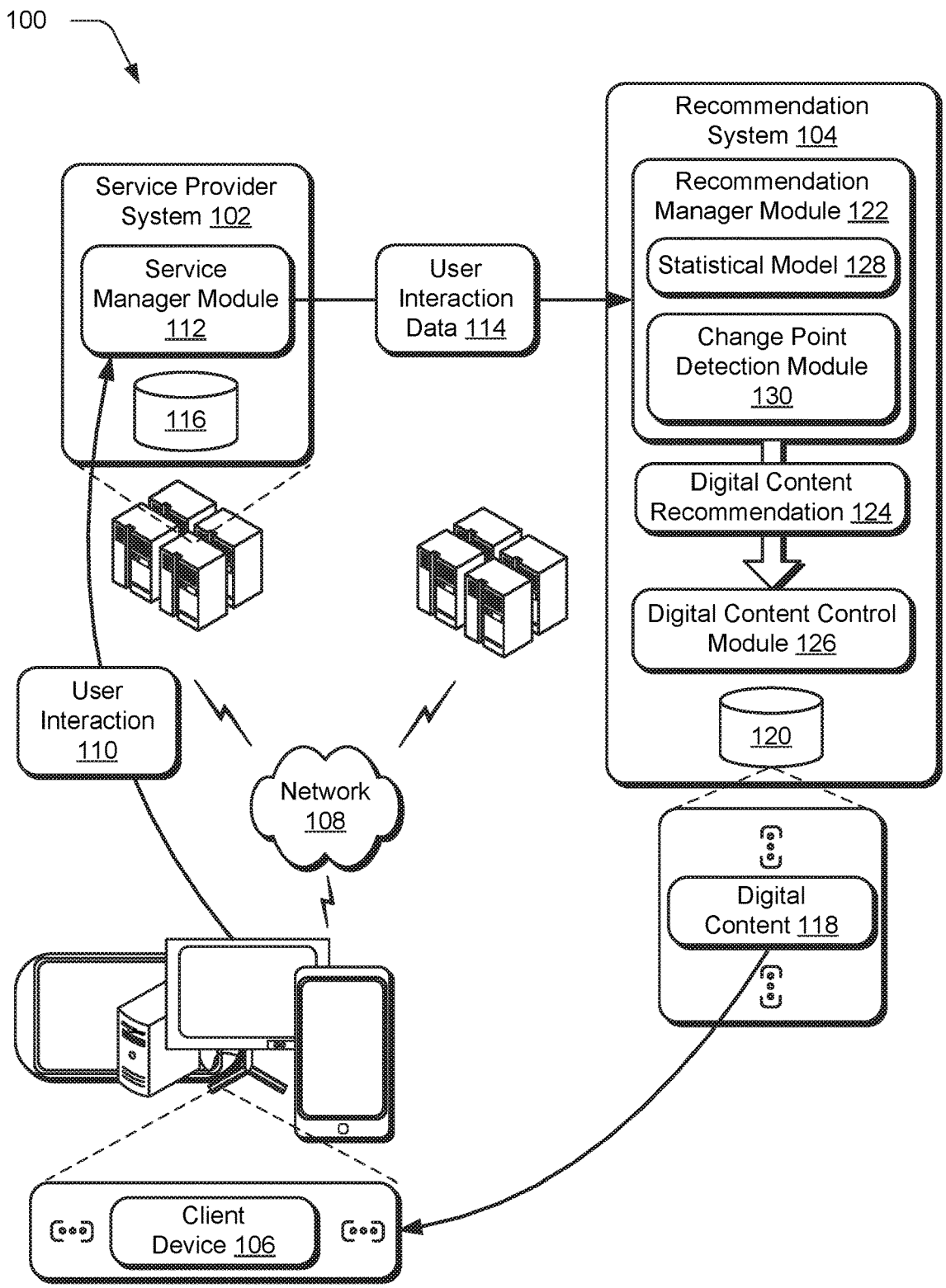
FIG. 1 is an illustration of an environment in an example implementation that is operable to employ change point detection techniques as part of a recommendation system as described herein.

Recommendation systems employ multi-arm bandit techniques to address online learning and sequential decision making in order to generate recommendations to cause a desired user action, which is modeled as a "reward" through use of a reward distribution for each option of the plurality of options that are being recommended. To do so, multi-arm bandit techniques are configured to maximize an amount of an overall reward over an amount of time, e.g., a collection of "T" time steps.

Conventional multi-arm bandit techniques, however, may fail in real world scenarios as described above. For example, a user's click probability on an item of digital content is unlikely to be time-invariant. On the other hand, the user's click probably is also unlikely to change significantly at each successive time step. As a result, in real world scenarios an adversarial bandit model may over represent changes at the time steps whereas a stochastic bandit model may under represent these changes. Thus, these conventional techniques lack accuracy, fail for their intended purpose, and result in inefficient use of computational resources as well as inefficient use of the limited amount of resources, for which, these techniques are configured to address, e.g., a limited amount of resources to submit and pay for bids for output of digital marketing content.

Accordingly, techniques are described in which a recommendation system employs change point detection as part of a multi-armed bandit (MAB) technique. To do so, the recommendation system is configured to employ a statistical model in which reward distributions for respective items of digital content (i.e., the options or "arms" in a multi-armed bandit) are considered to be piecewise constant at individual time steps. However, the recommendation system is also configured to address a shift at some unknown time step in the future, which is referred to as a "change point." Detection of the change point is then used to regenerate the statistical model by the recommendation system to address this change, and as such provides a middle ground to address change in real world scenarios that is not possible using conventional adversarial or stochastic models.

In one example, the recommendation system begins by generating a statistical model that includes reward distributions for each of a plurality of items of digital content based on user interaction data, e.g., through linear regression. The user interaction data, for instance, may describe user actions initiated in response to exposure to digital content, e.g., conversion caused by digital marketing content. The statistical model is then employed by the recommendation system to generate recommendations to maximize an overall reward over a series of time steps "T."

To do so, the recommendation system employs exploration techniques in which recommendations are generated to gather data regarding the reward distributions for respective items of digital content. The recommendation system also employs exploitation techniques to maximize a reward at a respective time step for a recommendation. In this way, the recommendation system may "learn" about the reward distributions of respective items of digital content through exploration and maximize the amount of rewards collected at the individual time steps through exploitation. Both of these techniques are thus employed to maximize an overall amount of reward over the series of time steps through learning about the rewards and collect the rewards based on this learned knowledge as described by respective reward distributions.

As described above, however, reward distributions for respective items of digital content (e.g., modeled as the "arms" in the multi-arm bandit) may change over time, but are typically invariant between successive time steps. Thus, conventional techniques often fail by over or under representing these changes as described above. To address this, a change point detection technique is employed by the recommendation system to identify when a change point has occurred at a respective time step of a series of time steps.

Thus, the change point may be detected as occurring at any one of the time steps and is not limited to modeling changes at each time step as in adversarial models or do not address change at all as in stochastic models. Detection of this change point may then be used by the recommendation system to reset the statistical model to address this change as well as generate a subsequent recommendation configured for exploration of reward distributions of the items of digital marketing content. In this way, the recommendation system may detect a change and, based on this, generate recommendations to learn about effects of the change on reward distributions overall in order to maximize overall rewards over a series of time steps.

Detection of the change point may be performed in a variety of ways by the recommendation system. In one example, the change point is detected by the recommendation system based at on a determination that a reward distribution for the item of digital content that is subject to a recommendation departs from a reward distribution of the statistical model for the item of digital content by at least a threshold amount. The change point, for instance, may be detected by the recommendation system by monitoring a mean of a respective reward distribution for an item of digital content that corresponds to the digital content recommendation. The recommendation system, for instance, may obtain data that describes that user interaction resulting from exposure to a recommendation may cause a change to a reward distribution for the item in the statistical model by greater than a threshold amount. Such a change is thus used by the recommendation system to determine that the statistical model is no longer accurate, and in response regenerate the model. In this way, the recommendation system may respond to changes in real world scenarios that is not possible using conventional techniques.

An Implementation Example is described in a respective section regarding a technique referred to as Monitored-Upper Confidence Bound (M-UCB), in which, a change point detection component is incorporated into an upper confidence bound technique. M-UCB, for instance, may be leveraged by the recommendation system to monitor a mean of the reward distribution for a currently selected item of digital content, i.e., "arm." Once a change is detected, the M-UCB technique is configured to reset the statistical model to adapt to the change and generate a recommendation for exploration to learn a new optimal arm. M-UCB is shown in the following to be nearly optimal for the considered scenario, in the sense that an $O(\sqrt{MKT\log T})$ regret bound may be established where T is the number of time steps, K is the number of arms, and M is the number of stationary segments. In a real-world scenario, M-UCB has been observed to achieve an approximate regret reduction of fifty percent with respect to the best performing state-of-the-art conventional techniques that are currently available. A variety of other examples are also contemplated.

In this way, the recommendation system provides a "middle ground" between conventional MAB techniques to address changes to reward distributions. As such, these techniques increase recommendation accuracy, computational efficiency of computing devices that implement the recommendation system, as well as digital content resources, e.g., amounts spent on bids for provision of digital marketing content.

Term Examples

A "multi-armed bandit" refers to a technique is configured to address allocation of a fixed limited set of resources (e.g., digital content) through use of recommendations in a way to maximize the reward. In this technique, the recommendation system is modeled to make a decision regarding which option in a collection of options to recommend, how many times to recommend each option, in which order to recommend the options, and whether to continue with a current option or to try a different option. Each option is modeled as providing a random reward based on a probability distribution specific to that machine, referred to as a reward distribution. Thus, the objective of the recommendation system is to maximize a sum of rewards earned through a series of recommendations by identifying which options (i.e., items of digital content) are to be subject of the user interaction.

"Digital content" refers to any type of data that is configured to be rendered for output by an output device of a computing device to a user. Examples of digital content include digital images, digital audio, digital media, digital video, digital articles, digital text, and so forth. Digital marketing content is a type of digital content that is configured to promote conversion of a good or service, e.g., "click" on an ad, purchase of a good or service, and so forth.

"Recommendations" are a suggestion or proposal as to a best course of action to achieve a desired result, e.g., the "reward" in the multi-armed bandit technique. In a digital content context, recommendations may identify which item of digital content is likely to achieve a desired result, e.g., conversion for digital marketing content.

A "confidence interval" is a range of values so defined that there is a specified probability a true value of a parameter lies within it. The confidence level of a noise estimate defines an amount of uncertainty that a true noise value is included within the noise estimate.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Environment

FIG. 1 is an illustration of a digital medium environment 100 in an example implementation that is operable to employ recommendation generation and digital content control techniques described herein. The illustrated environment 100 includes a service provider system 102, a recommendation system 104, and a plurality of client devices, an example of which is illustrated as client device 106. These devices are communicatively coupled, one to another, via a network 108 and may be implemented by a computing device that may assume a wide variety of configurations. In the following, the recommendation system 104 is configured to generate a digital content recommendation 124, which is also referred to simply as a recommendation 124 in the following for the sake of brevity in the discussion.

The digital medium environment 100 may be implemented in a variety of ways to leverage recommendations 124 generated by the recommendation system 104. The digital medium environment 100, for instance, may utilize the recommendation system 104 as an information filtering system that seeks to predict user preferences with respect to an item, e.g., as a rating or "reward." The rating then serves as a basis to form a recommendation for an item chosen from a plurality of items. As such, recommendations generated by the digital media environment 100 may take a variety of forms, such as to recommend items of digital content (e.g., digital movies, digital articles), news articles (e.g., in a digital newsfeed), search, social media (e.g., friends in a social network service), locations (e.g., restaurants, events, shows), as part of online dating, financial services, social media websites, humor, and so forth.

In a first example, the digital medium environment 100 is a digital marketing environment. The recommendation system 104, for instance, may be configured to generate the recommendation 124 as an item of digital marketing content to promote conversion of a good or service. Examples of digital marketing content include banner ads, videos, sidebar advertisements, pop-up ads, and so forth. This digital marketing content may then be included as part of webpages originated by the service provider system 102 and communicated to the client device 106.

To do so, the recommendation system 104 generates a recommendation 124 describing which advertisement is selected for output to the client device 106 for inclusion with the webpage from the service provider system 102. This may be performed, for instance, by processing user interaction data 114 by the recommendation system 104 to generate a recommendation 124 to promote conversion of a good or service, whether from the service provider system 102 or other source. Other digital marketing examples are also contemplated, such as to support recommendations 124 to select electronic messages, emails, or other communications that are communicated to the client device 106 to cause conversion of a good or service.

In a second example, the digital medium environment 100 is an electronic commerce environment. In this instance, the recommendation 124 is generated by the recommendation system 104 to identify a product or service made available by the service provider system 102. The service provider system 102, for instance, may make items of digital content available to the client device 106, e.g., for purchase, as part of a subscription, and so forth. This may include a wide range of digital content, including digital movies, digital music, digital books, digital images, digital media, digital article, and so forth.

Accordingly, the recommendation system 104 in this second example generates a recommendation 124 identifying which item of digital content is most likely of interest to a client device 106 to cause conversion of that item from the service provider system 102. This may be used, for instance, to suggest a particular book or article to read, form a listing of digital audio as part of a streaming musical playlist, and so forth. The service provider system 102, for instance, may be configured to stream digital music to the client device 106 based on recommendations generated by the recommendation system 104. Other examples are also contemplated, such as to recommend digital articles as part of a news service system, digital movies as part of a streaming service, and so forth.

In a third example, the digital medium environment 110 is an online search system. The service provider system 102, for instance, may be configured to support search functionality to locate items of digital content 118. To do so, the recommendation system 104 generates recommendations to select items of digital content 118 that are to be included in a search result.

The search functionality of the service provider system 102, for instance, may be included in an e-commerce website to locate goods or services or interest. In another instance, the search functionality is included in a listing service system, and as such, leverages the recommendation generated by the recommendation system 104 to locate homes, vehicles, apartments, and other items. In this way, the recommendation 124 generated by the recommendation system 104 may increase accuracy of the search result. A variety of other digital medium environment 100 configurations are also contemplated that leverage use of a recommendation 124 generated by the recommendation system 104, such as to control output of digital content 118 to a client device 106 as illustrated.

A computing device used to implemented the illustrated devices and systems may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as shown for the service provider system 102 and the recommendation system 104 and as further described in FIG. 6.

The client device 106 is illustrated as engaging in user interaction 110 with a service manager module 112 of the service provider system 102. The service provider system 102, for instance, may be configured to support user interaction with digital content 118. User interaction data 114 is then generated (e.g., by the service manager module 112) that describes this user interaction 110, which may be stored in a storage device 116.

Digital content 118 may take a variety of forms and thus user interaction 110 with the digital content 118 may also take a variety of forms. For example, a user of the client device 106 may read an article of digital content 118, view a digital video, listen to digital music, view posts and messages on a social network system, and so forth. In another example, the digital content 118 is configured as digital marketing content to cause conversion of a good or service, e.g., by "clicking" an ad, purchase of the good or service, and so forth. Digital marketing content may also take a variety of forms, such as electronic messages, email, banner ads, posts, and so forth. Accordingly, digital marketing content is typically employed to raise awareness and conversion of the good or service corresponding to the content. In another example, user interaction 110 and thus generation of the user interaction data 114 may also occur locally on the client device 106.

The user interaction data 114 is received by a recommendation system 104, which employs this data to control output of the digital content 118 to the client device 106. To do so, a recommendation manager module 122 generates a recommendation 124 configured to control which items of the digital content 118 are output to the client device 106, e.g., directly via the network 108 or indirectly via the service provider system 102, by the digital content control module 126.

The recommendation 124, for instance, may be configured to specify which article of digital content 118 is to be transmitted to the client device 106 via the service provider system 102. In another instance, the recommendation 124 identifies which item of digital marketing content is to be served as part of a webpage. In a further instance, the recommendation 124 is the item of digital content 118, itself, such as to recommend digital videos, the recommendation is then selectable to cause output of those videos. Thus, although the digital content 118 is illustrated as maintained in the storage device 120 by the recommendation system 104, this content may also be maintained and managed by the service provider system 102, the client device 106, and so forth.

The recommendation system 104 is configured to maximize an effectiveness of the digital content 118 on causing a user interaction by a user of the client device 106, i.e., a "reward." The reward, for instance, may be modeled for each item of digital content using a reward distribution to describe a probability of causing the user action to read of an article, listen to a song in digital audio, watch a digital video, cause conversion of digital marketing content, and so forth. To do so, the recommendation manager module 122 leverages information about the user interaction data 114 and information about the digital content 118 to estimate effectiveness of each of the items of digital content 118 in achieving the desired user interaction as the "reward" for exposing the digital content 118 through use of a statistical model 128. The statistical model 128, for instance, may be "fit" to the user interaction data 114 to model a reward distribution for each of the items of digital content 118, e.g., through a regression technique such as linear regression.

As part of generating the recommendations 124 based on the statistical model 128, the recommendation manager module 122 is configured to address a tradeoff between exploration and exploitation to maximize an amount of the reward received over a series of time steps. In exploration, the recommendation of digital content 118 is generated to improve knowledge about a relationship (e.g., linear relationship) between exposure to the recommendation and the reward, e.g., to further refine the statistical model 128 as increasing knowledge of the reward through use of the user interaction data 114. In exploitation, the recommendation 124 of digital content 118 is generated to maximize effectiveness in achieving the desired user interaction, e.g., based on the reward distribution of the statistical model 128 for respective items of digital content 118. This tradeoff involves balancing a goal of generating the recommendation 124 of digital content 118 that is most effective and determining which recommendation 124 of digital content 118 is most effective. Thus, at some time steps it may be desirable to generate a recommendation 124 for sub-optimal digital content 118 (i.e., is less effective) to learn more about the relationship between the digital content that corresponds to the digital content recommendation and the reward and thus increase a likelihood of accuracy of the recommendation 124.

Previous techniques used to generate recommendations, however, lack accuracy and thus result in inefficient use of computational resources as well as available resources to make digital content 118 available, e.g., via digital marketing opportunities. For example, a user actions are unlikely to remain the same over time, due to changes in user preferences. On the other hand, significant changes are unlikely to occur at each successive time step. As a result, conventional techniques such as an adversarial bandit model in real world scenarios may over represent changes at the time steps whereas a stochastic bandit model may under represent these changes. Thus, these conventional techniques lack accuracy, fail for their intended purpose, and result in inefficient use of computational resources as well as inefficient use of the limited amount of resources, for which, these techniques are configured to address, e.g., a limited amount of resources to submit and pay for bids for output of digital marketing content.

Accordingly, the recommendation manager module 122 is configured in this instance to employ a change point detection module 130 that is representative of functionality to detect a change point in the user interaction data 114. Change point detection technique is employed to identify when a change point has occurred at a respective time step in a series of time steps. Detection of this change point may then be used by the recommendation system 104 to regenerate the statistical model 128 to address this change as well as generate a subsequent recommendation configured for exploration of reward distributions of the items of digital marketing content. In this way, the recommendation system 104 may detect a change and, based on this, generate recommendations to learn about effects of the change on reward distributions overall in order to maximize overall rewards over a series of time steps.

At a first time step, for instance, an initial digital content recommendation 124 is made based on the statistical model 128 by the recommendation system 104 and communicated to the client device 106, e.g., based on exploration or exploitation as described above. In response, user interaction data 114 is then received by the recommendation system 104 that describes a "result" of the recommendation, e.g., did the user interaction occur, an extent of the user interaction (e.g., amount of time an article is read, whether an advertisement was "clicked" as opposed to resulting in a direct purchase), and so forth.

At a second time step, the statistical model 128 is updated by the recommendation managed module 122 based on the user interaction data 114 generated in response to the first digital content recommendation 124. The recommendation manager module 122, for instance, may update a reward distribution corresponding to the item of digital content 118 that is a subject of the digital content recommendation 124.

This serves as a basis by the recommendation system 104 to generate another digital content recommendation 124. In response, user interaction data 114 is again received by the recommendation system 104 that describes the result of this other recommendation. The user interaction data 114 is then used to update and refine the statistical model 128 as before, e.g., to update a corresponding reward distribution. This process may continue to generate recommendations and refine reward distributions of the statistical model 128.

As previously described, reward distributions of the statistical model 128 for respective items of digital content 118 in real world scenarios may change over time, but are typically invariant between successive time steps. As such, conventional techniques over or under represented that changes. Accordingly, the change point detection 130 is employed by the recommendation system to identify when a change point has occurred at a respective time step of a series of time steps, which may be performed in a variety of ways. In one example, the change point is detected based on a determination that a reward distribution for the item of digital content that is subject to a recommendation departs from a reward distribution of the statistical model for the item of digital content by at least a threshold amount. The change point, for instance, may be detected by monitoring a mean of a respective reward distribution for an item of digital content that corresponds to the digital content recommendation as further described below.

Detection of this change point may then be used by the recommendation system to reset the statistical model 128 to address this change. This is also used to cause generation of a subsequent recommendation configured for exploration of reward distributions of the items of digital marketing content. In this way, the recommendation system 104 may detect a change and, based on this, generate recommendations to learn about effects of the change on reward distributions overall in order to maximize overall rewards over a series of time steps. An implementation example is described in a respective section regarding an example of such a technique, which is referred to as Monitored-Upper Confidence Bound (M-UCB).

Figure 2:
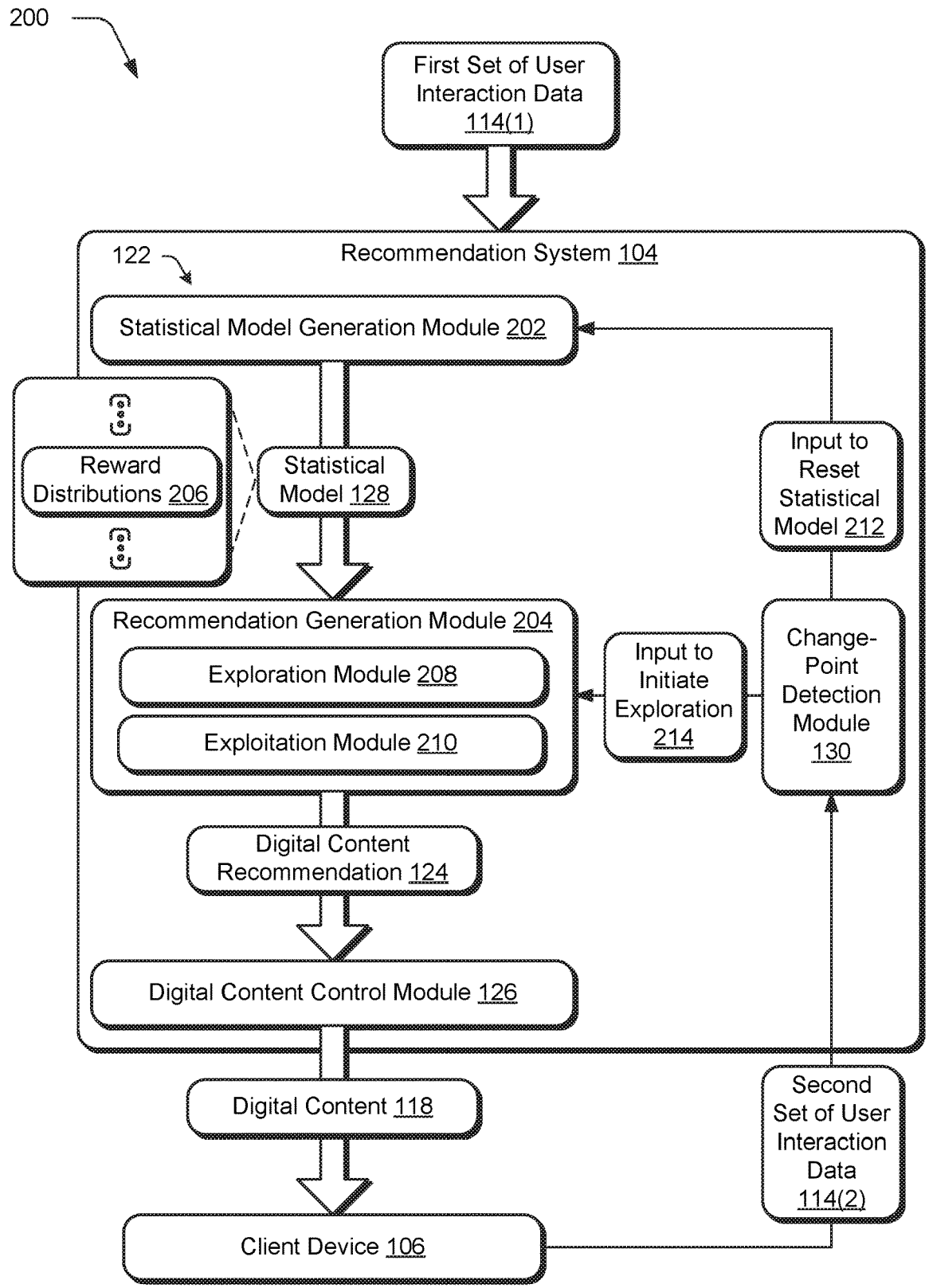
FIG. 2 depicts a system in an example implementation of change point detection in a multi-armed bandit recommendation system.
Figure 3:
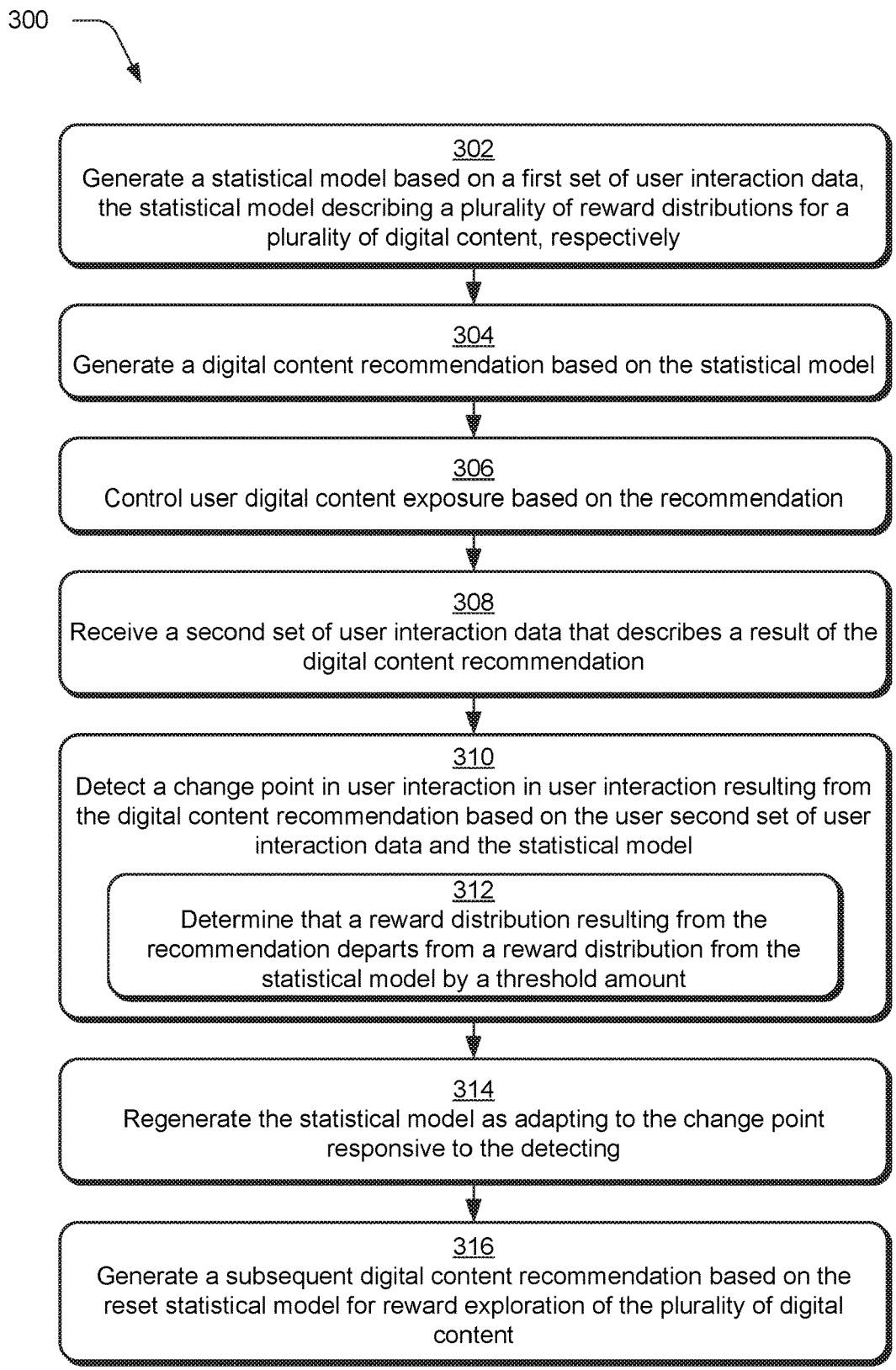
FIG. 3 is a flow diagram depicting a procedure in an example implementation of change point detection as part of a recommendation system to update statistical models and control generation of recommendations usable to control digital content output.

FIG. 2 depicts a system 200 in an example implementation of change point detection in a multi-armed bandit recommendation system. FIG. 3 depicts a procedure 300 in an example implementation in which a change point detection as part of a recommendation system to update statistical models and control generation of recommendations usable to control digital content output.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference is made interchangeably to FIGS. 1-3.

Functionality of the recommendation manager module 122 is illustrated as being implemented by a statistical model generation module 302 and a recommendation generation module 304 in this example. To begin, a first set of user interaction data 114(1) is received by the recommendation system 104. A statistical model generation module 202 is then employed by the recommendation system 104 to generate a statistical model 128 based on the first set of user interaction data 114(1). The statistical model 128 describes a plurality of reward distributions 306 for a plurality of digital content 118, respectively (block 302).

The user interaction data 114, for instance, may describe performance of user actions in response to exposure to digital content 118. This may include whether a movie or article was consumed by a respective user of a client device 106 based on a recommendation, purchase of a good or service in response to an item of digital marketing content, and so forth. The statistical model 128 may be generated in a variety of ways, such as through use of regression analysis techniques including linear regression. In this way, the statistical model 128 includes a reward distribution 206 for each of the items of digital content 118, which may be further refined (i.e., learned) through exploration or leveraged through exploitation. The reward distribution 206, for instance, may describe a probability of receiving a reward, an amount of that reward, and so on.

The statistical model 128 is then employed by a recommendation generation module 304 to generate a digital content recommendation 124 (block 304). As part of this, the recommendation generation module 204 is configured to address a tradeoff between exploration as implemented by an exploration module 208 and exploitation as implemented by an exploitation module 210. In exploration, the digital content recommendation 124 generated to improve knowledge about a relationship (e.g., linear relationship) between the feature vector and the reward, e.g., to further refine the statistical model 128 as increasing knowledge of the reward through use of the user interaction data 114. Thus, exploration is implemented by the exploration module 208 to increase an amount of data gathered for each of the plurality of items of digital content 118 as serving as a basis for digital content recommendation generation by the statistical model 128. An example of an exploration technique that may be implemented by the exploration module 208 includes a uniform sampling exploration technique.

In exploitation as implemented by the exploitation module 210, the recommendation 124 of digital content 118 is generated to maximize effectiveness in achieving the desired user interaction, e.g., based on the reward distribution of the statistical model 128 for respective items of digital content 118. An example of an exploitation technique includes an upper confidence bound (UCB) technique.

Thus, in exploitation as implemented by the exploitation module 210 a digital content recommendation 124 is generated to maximize a reward at an individual time step. Exploration as implemented by the exploration module 208 is used to increase knowledge and accuracy of the reward distributions 206, e.g., a confidence interval for each distribution. This increased knowledge and accuracy may then be used to further exploit collection of rewards for future time steps and thus maximize the reward for a series of times steps "T."

In this way, the recommendation generation module 204 is configured to address a tradeoff involves balancing a goal of generating the recommendation 124 of digital content 118 that is most effective and determining which recommendation 124 of digital content 118 is most effective. Thus, in some instances it may be desirable to generate a recommendation 124 for sub-optimal digital content 118 (i.e., is less effective) to learn more about a relationship between the digital content of the digital content recommendation 124 and the reward and thus increase a likelihood of accuracy of the recommendation.

The digital content recommendation 124 is then used to control digital content exposure (block 306) by a digital content control module 126. The digital content recommendation 124, for instance, may be configured to identify an item of the digital content 118 for output to a client device 106 via the network 108. This may include digital marketing content (ads), identification of items of digital content, and so forth.

A second set of user interaction data 114(2) is then received that describes a result of the controlled output of the digital content (block 308). A change point detection module 130 is then used to determine whether a change has occurred at this timestep and/or after a series of time steps to the statistical model 128 (block 310). Detection of the change point may be performed in a variety of ways.

In one example, the change point is detected based at on a determination that a reward distribution for the item of digital content that is subject to the digital content recommendation 124 departs from a reward distribution 206 of the statistical model 128 for the item of digital content 118 by at least a threshold amount (block 312). This may be performed, for instance, by monitoring a mean of a respective reward distribution for an item of digital content as further described in the Implementation Example below.

In response to detection of the change point, the change point detection module 130 is configured to initiate a variety of actions. In one example, the change point detection module 130 initiates an input 312 to regenerate the statistical model 128 by the statistical model generation module 302 to address the change (block 314). In this way, the statistical model 128 is updated and reset in response to changes that are deemed to at least have a threshold level of significance, thereby addressing changes as observed in real world scenarios and conserving computational resources.

An input 214 is also communicated from the change point detection module 130 to the recommendation generation module 204 to initiate generation of a subsequent digital content recommendation 124 for exploration (block 316). Thus, this exploratory recommendation is configured to learn about the changes in the reward distributions of the statistical model 128 that caused detection of the change point. As a result, the recommendation system 104 may overcome the challenges in conventional multi-arm bandit techniques that either overrepresent or underrepresent changes, which result in inefficient use of computation and digital content resources or lack of accuracy and thus also inefficient use of digital content resources. Further discussion of these and other examples is included in the following Implementation Example Section.

Implementation Example

In this section, an example is described regarding a technique referred to as Monitored-Upper Confidence Bound (M-UCB), in which, a change point detection module 130 is incorporated into an upper confidence bound technique of a recommendation system 104. M-UCB, for instance, may be leveraged by the recommendation system 104 to monitor a mean of the reward distribution for a currently selected item of digital content, i.e., "arm." Once a change is detected, the M-UCB technique is configured to reset the statistical model to adapt to the change and generate a recommendation for exploration to learn a new optimal arm. M-UCB is shown in the following to be nearly optimal for the considered scenario, in the sense that an O($\sqrt{MKT\log T}$) regret bound may be established where T is the number of time steps, K is the number of arms, and M is the number of stationary segments. In a real-world scenario, M-UCB has been observed to achieve an approximate regret reduction of fifty percent with respect to the best performing conventional techniques.

Piecewise-Stationary Bandit

A piecewise-stationary bandit is characterized by a triple ($\mathcal{K}, \mathcal{T}, \{f_{k,t}\} k \in \mathcal{K}, t \in \mathcal{T}$), where $\mathcal{K} = \{1, \ldots, K\}$ is a set of K arms, $\mathcal{T} = \{1, \ldots, T\}$ is a sequence of T time steps, and $f_{k,t}$ is the reward distribution of arm k at the t. Specifically, the arm k's reward at time t, $X_{k,t}$, is assumed to be independently drawn from $f_{k,t}$, both across arms and across time steps. A value $\mu_{k,t} = \mathbb{E}[X_{k,t}]$ is defined as the expected reward of arm k at time t. Without loss of generality, support of $f_{k,t}$ is assumed as a subset of [0,1] for all $k \in \mathcal{K}$, $t \in \mathcal{T}$. The value M is defined as a number of piecewise-stationary segments in the reward process as follows:

$$M = 1 + \Sigma_{t=1}^{T-1} II \{f_{k,t} \neq f_{k,t+1} \text{ for some } k \in K\},$$

where II { } is the indicator function. Notice that by definition, the number of change points is M−1. The values $v_1, v_2, \ldots, v_{M-1}$ are used to denote those M−1 change points in the following discussion, and the values of $v_0 = 0$ and $v_M = T$ are defined to simplify the exposition. To emphasize the "piecewise stationary" nature of this problem, for each stationary segment i=1, 2, ..., M with t∈[$v_{i-1}$+1,$v_i$], $f_k^i$ and $\mu_k^i$ are used to respectively denote the (same) reward distribution and the (same) expected reward of arm k on this segment. Shorthand notation is defined as $\mu^i = (\mu_1^i, \ldots, \mu_K^i)^T$.

The recommendation system 104 is configured to repeatedly interact with this piecewise stationary bandit for T times. The recommendation system 104 knows $\mathcal{T}$ and $\mathcal{K}$, but does not know $\{f_{k,t}\} k \in \mathcal{K}$, $t \in \mathcal{T}$ or any of its statistics such as M and $\mu^i$'s. At each time step $t \in \mathcal{T}$, the recommendation system 104 adaptively chooses an action $A_t$ based on its past actions and observations, and receives and observes the reward $X_{A_t,t}$, which is conditionally independently drawn from $f_{A_t,t}$. The recommendation system's 104 objective is to maximize an expected cumulative reward in the T time steps, i.e., max $\mathbb{E}[\Sigma_{t=1}^T X_{A_t,t}]$, which is equivalent to minimize its T-step cumulative regret $\mathcal{R}(T)$, which is defined as:

$$\mathcal{R}(T) = \Sigma_{t=1}^T \max_{k \in \mathcal{K}} \mathbb{E}[X_{k,t}] - \mathbb{E}[\Sigma_{t=1}^T X_{A_t,t}].$$

First, notice that the considered piecewise stationary bandit model has increased generality than both the stochastic bandit model and the adversarial bandit model. Specifically, the stochastic bandit model can be viewed as a special case of the current statistical model with M=1, and the adversarial bandit model can also be viewed as a special case of the current statistical model with M=T. Second, the regret metric defined in Equation 2 in the following is stricter than conventional regret metrics, which is defined as follows:

$$\tilde{\mathcal{R}}(T) = \max_{k \in \mathcal{K}} \sum_{t=1}^T \mathbb{E}[X_{k,t}] - \left[\sum_{t=1}^T X_{A_t,t}\right].$$

Clearly $\mathcal{R}(T) \geq \tilde{\mathcal{R}}(T)$, since in Equation 2 the regret is measured with $\mathcal{R}$ respect to the optimal piecewise stationary policy, while in Equation 3 the regret is measured with respect to the optimal action in hindsight.

Sequential Change Point Detection

In this section, conventional sequential change point detection (CD) techniques are described. One such algorithm is then described as suitable for the piecewise-stationary bandits techniques described herein. Sequential change point detection, as a fundamental part in sequential analysis, is used to detect a change in underlying distributions of a sequence of observations. Although detection techniques such as the CUSUM and the generalized likelihood ratio (GLR) procedure are available, these techniques are computationally expensive.

Note that for piecewise-stationary bandit, both pre-change and post-change distributions are unknown so it is a "double unknown" case. CUSUM assumes all parameters are known. GLR allows for unknown parameters and estimates the parameters sequentially from data, however, it is computationally expensive.

To overcome this difficulty, a change detection technique 400 is employed, an example of which is depicted in FIG. 5. This technique is sufficient and nearly optimal to guide the bandit decision regarding generation of a digital content recommendation, e.g., for exploration or exploitation. Assume w observations $Y_1, \ldots, Y_w \in [0,1]$, where w is an even number. Algorithm 1 of the change detection technique 400 aims to detect whether a change happens in the middle of the sequence. Using McDiarmid's Inequality, the probability of Algorithm 1 returning True is upper bounded by 2 exp($-2b^2/w$) is shown when there is no change, and is lower bounded by 1-2 exp($wc^2/4$) when a change happens at w/2, where c=|$\mathbb{E}[Y_{w/2+1} - Y_{w/2}]$|/w−2b. This shows that Algorithm 1 of the change detection technique 400 can achieve a small probability of raising false alarms and a large probability of performing successful detections simultaneously by choosing an appropriate threshold b.

M-UCB Algorithm

Figure 4:
FIG. 4 depicts a first example algorithm as part of a multi-armed bandit recommendation system.

A learning technique, referred to as the Monitored UCB (M-UCB) is described in Algorithm 2 of FIG. 5, for the piecewise-stationary bandits discussed above. Generally speaking, Algorithm 2 combines three ideas: 1) uniform sampling exploration to ensure that sufficient data are gathered for all arms to perform CD, 2) UCB-based exploitation to learn the optimal arm on each segment, and 3) use Algorithm 1 of FIG. 4 to detect changes and restart exploration.

Inputs to Algorithm 2 include the time horizon T, the number of arms K, and three tuning parameters w, b, and $\gamma$. Specifically, w and b are tuning parameters for the CD algorithm (line 15), which can be tuned to control the power of the CD algorithm; and $\gamma$ controls the fraction of the uniform sampling (line 3). A value $\tau$ is used to record the last detection time, and $n_k$ is used to denote the number of observations from the kth arm after $\tau$.

At each time t, M-UCB proceeds as implemented by the change point detection module 130 as follows. First the change point detection module 130 uses M-UCB to determine whether to perform uniform sampling exploration or a UCB-based exploitation at this time. The condition to perform uniform sampling is given in lines 3 and 4, which ensures that the fraction of time steps performing uniform sampling is roughly $\gamma$. If M-UCB chooses to do UCB-based exploitation at time t, then it computes UCB1 indices based on its observations after the last detection time $\tau$, and choose action greedily to the UCB1 indices (line 7-10). Then M-UCB plays the chosen arm, receives and observes the reward, and updates statistics of the statistical model 128 (line 12-13). Finally, when at least w observations for the chosen arm have been gathered after the last detection time $\tau$, M-UCB performs CD based on Algorithm 1. If Algorithm 1 returns True, M-UCB restarts exploration.

Regret Bound

In this section, a regret bound is proven for the M-UCB algorithm (Algorithm 2). Recall that T is the time horizon, K is the number of arms, M is the number of piecewise-stationary segments, $v_0, \ldots, v_M$ are the change points, and for each $i=1, \ldots, >$, $u^i \in [0,1]^K$ is a vector encoding the expected rewards of all arms on segment i. The values $\mathbb{P}$ and $\mathbb{E}$ are used to respectively denote a probability measure and an expectation according to the piecewise-stationary bandit characterized by the tuple (T, K, M, $\{v_i\}_{i=0}^M$, $\{\mu^i\}_{i=1}^M$). To simplify the exposition, the "suboptimal gap" of arm k on the i-th piecewise-stationary segment is defined as:

$$\Delta_k^{(i)} = \max_{k \in \mathcal{K}} \{\mu_k^i\} - \mu_k^i \; \forall \; 1 \le i \le M, k \in \mathcal{K},$$

and the amplitude of change of arm k at the ith change point as:

$$\delta_k^{(i)} = |\mu_k^{i+1} - \mu_k^i|, \forall 1 \le i \le M-1, k \in \mathcal{K}.$$

Moreover, recall that w, b and $\gamma$ are the tuning parameters for Algorithm 2. Shorthand notation is defined as $L=w\lceil K/\gamma \rceil$.

Assumption 6.1 The recommendation system 104 can choose w and $\gamma$ s.t. (a) $M < \lceil T/L \rceil$ and $v_{i+1} - v_i > L$, $\forall 1 \le i \le M-1$, and (b) $\exists k \in \mathcal{K}, \forall 1 \le i \le M-1, \mu^1, \ldots, \mu^M \in [0,1]^K$ and $$\delta_k^{(i)} \ge 2 \sqrt{\log(2KT^2)/w} + 2\sqrt{\log(2T)/w}.$$

Intuitively, Assumption 6.1(a) means that the length of the time interval between two consecutive change points is larger than L. This guarantees that Algorithm 2 can select at least w samples from every arm, and these samples are used to feed the CD algorithm. Assumption 6.1(b) means that the change amplitude is over certain threshold for at least one arm at each change point. This guarantees that the CD algorithm is able to detect the change quickly with limited information.

Theorem 6.1. Running Algorithm 2 with w and $\gamma$ satisfying Assumption 6.1 and $b=[w \log(2KT^2)/2]^{1/2}$, results in the following:

$$\mathcal{R}(T) \le \underbrace{\sum_{i=1}^{M} \tilde{C}_i}_{(a)} + \underbrace{\gamma T}_{(b)} + \underbrace{\sum_{i=1}^{M-1} \frac{K \cdot \min\left(\frac{w}{2}, \left\lceil \frac{b}{\delta^{(i)}} \right\rceil + 3\sqrt{w}\right)}{\gamma}}_{(c)} + \underbrace{3M}_{(d)},$$

where $\delta^{(i)} = \max_{k \in \mathcal{K}} \delta_k^{(i)}$ and $$\tilde{C}_i = 8 \sum_{\Delta_k^{(i)} > 0} \frac{\log T}{\Delta_k^{(i)}} + \left(1 + \frac{\pi^2}{3} + K\right) \sum_{k=1}^{K} \Delta_k^{(i)}.$$

Theorem 6.1 reveals that the regret incurred by M-UCB can be decomposed into four terms. Terms (a) and (b) in Equation 6 are bounds on the exploration costs. Specifically, term (a) bounds the cost of the UCB-based exploration, and term (b) bounds the cost of the uniform sampling. On the other hand, terms (c) and (d) are bounds on the change point detection costs. In particular, term (c) bounds the cost associated with the detection delay of the CD algorithm, and term (d) is incurred by the unsuccessful and incorrect detections of the change points.

The following corollary follows immediately from Theorem 6.1.

Corollary 6.1.1. Assume a lower bound $\delta$ for $\{\delta^{(i)}\}_{i=1}^{M-1}$. Algorithm 2 is executed with w, $b=[w \log(2KT^2)/2]^{1/2}$, and $$\gamma = \sqrt{\sum_{i=1}^{M-1} K \cdot \min(w/2, \lceil b/\delta \rceil + 3\sqrt{w})/(2T)},$$

to obtain:

$$\mathcal{R}(T) \le \sum_{i=1}^{M} \tilde{C}_i + \sqrt{\sum_{i=1}^{M-1} 2TK \cdot \min(w/2, \lceil b/\delta \rceil + 3\sqrt{w})} + 3M.$$

Define that $\Delta = \min_{k \in \mathcal{K}, i \in \{1, \ldots, M\}} \Delta_k^{(i)}$. For any fixed w, the upper bound for the regret in (7) is in $O(MK \log T/\Delta + \sqrt{MKT\log T}) = \tilde{O}(\sqrt{MKT})$, where $\tilde{O}$ notation hide logarithmic factors. Notice that above a classic technique is used to replace the gap-dependent bound in $O(MK \log T/\Delta)$ with a gap-free bound in $O(\sqrt{MKT\log T})$. Compared with the lower bound in $\Omega(\sqrt{T})$, our regret bound is asymptotically tight up to a logarithmic factor.

Remark 1. Assume that the length of the interval between two consecutive change points is long enough, the value w is set approximately equal to $(4/\delta^2) [(\log(2KT^2))^{1/2} + (\log(2T))^{1/2}]^2$ in practice to satisfy Assumption 6.1.

Corollary 6.1.1 also provides some insights on how to choose tuning parameters for Algorithm 2. Notice that once w is chosen, $\gamma$ and b can be chosen based on Corollary 6.1.1, hence, it is sufficient to choose a w satisfying Assumption 6.1. Assumption 6.1(b) suggests that w is to be chosen large enough such that at each change point there exists at least one arm with a mean shift larger than $2\sqrt{\log(2KT^2)/w} + 2$ $\sqrt{\log(2T)/w}$. On the other hand, Assumption 6.1(a) means that an arbitrarily large w is not to be chosen since Assumption 6.1(a) requires that the minimal length of the interval between two consecutive change points is wK/γ. Thus, a good choice of w provides a balance between Assumption 6.1(a) and 6.1(b).

For the proof of Theorem 6.1, consider the set of good events and the set of bad events. The set of good events is defined as all the sample paths that Algorithm 2 reinitializes the UCB algorithm fast after any change point. The set of bad events, defined as the complement of the set of good events, includes each of the sample paths that Algorithm 2 fails to reinitialize the UCB algorithm fast when there is actually a change point and that Algorithm 2 reinitializes the UCB algorithm when there is not any change point. Relating the probability measure of the set of bad events with the parameters, the parameters are tuned to achieve a high probability of good events happening and a small probability of bad events happening. Then, the upper bounds are analyzed for the expected regret conditional on the good events and the bad events respectively. Finally, the regret bound is achieved by using the law of total expectation in a recursive manner.

Experiments

In this section, numerical experiment results are demonstrated that numerically validate the scaling of M-UCB's regret in M and K.

Validation of Regret Bound

Recall that by appropriately choosing the algorithm parameters, Corollary 6.1.1 achieves a $\tilde{O}(\sqrt{MKT})$ regret bound for M-UCB, and this regret bound is asymptotically tight in T up to a logarithmic factor. In this subsection, the scalings of the M-UCB's regret are validated in M and K are roughly $O(\sqrt{M})$ and $O(\sqrt{K})$, as is suggested in Corollary 6.1.1. This shows that the regret incurred by M-UCB is on the order of $O(\sqrt{M})$ for a fixed number of arms K. Specifically, K=10. The locations of change points are evenly spaced with interval of length 20000, so for any M, T=20000·M. For the reward sequence of each arm, $\mu^i = \mu$ if i is odd and $\mu^i = 1 - \mu$ if i is even, where $\mu \in [0,1]^K$ is randomly chosen such that the difference between the largest and smallest entry is larger than 0.6. In other words, the reward process forms a flipping piecewise-stationary environment. Consider an upper bound 20000×25 for T, an upper bound 10 for K and a lower bound 0.6 for δ, based on Remark 1, and set w=800. Then, compute b and γ using the theoretical value in Theorem 6.1 as follows: $b = \sqrt{(w/2) \cdot \log(2KT^2)}$ and $\gamma = \sqrt{(M-1)K \cdot (2b + 3\sqrt{w})/2T}$. One hundred instances are randomly generated and for each instance the algorithm iterates fifty times and the averaged regret is used to approximate the expected regret. The averaged regret is divided by $\sqrt{T}$ so as to eliminate the scaling issue caused by different T's. Fitting the sample points to a model $y = c + ax^b$ using least square techniques results in b=0.55, which shows that the regret is almost on the order of $O(\sqrt{M})$.

Similarly, the regret incurred by M-UCB is on the order of $O(\sqrt{K})$ for fixed number M of segments. In this case, M=4, T=3×10^5 and the change points are evenly spaced. For each i=1, . . . , 4, $\mu^i \in [0,1]^K$ is randomly generated such that the difference between the largest and smallest entry is larger than 0.6 and one combination of K and $(\mu^{(i)})_{i=1}^4$ forms one instance. For the techniques described herein, the same parameters are set as those in the first simulation example. One hundred instances are randomly generated and for each instance the technique iterates fifty times. The averaged regret is used to approximate the expected regret. The averaged regret is divided by $\sqrt{T}$ so as to eliminate the scaling issue caused by different T's. Fitting the sample points to a model $y = c + ax^b$ results in b=0.53, which means that the regret of the techniques described herein actually grow at a rate of $O(\sqrt{K})$ as K grows from 2 to 100. These results validate the $O(\sqrt{M})$ and $O(\sqrt{K})$ scalings of the M-UCB's regret in M and K, and suggest that the regret bound in Corollary 6.1.1 is roughly tight in M and K.

Experimental Dataset

In this subsection, the expected cumulative regret of different algorithms is compared using a benchmark dataset. This dataset provides a binary value for each arrival to represent whether the user clicks the specified article. To fit the MAB settings, one arm is used to represent one article and a Bernoulli reward is assumed, i.e., one if the user clicks the article and zero otherwise. Then, the goal is set to maximize the expected number of clicked articles using strategies that select one article for each arrival sequentially. Six different articles are randomly selected of which the click-through rates are greater than zero within one five-day horizon, where the click-through rates are computed by taking the mean of the number of times each article being clicked every 43200 seconds (half day). If the difference between the estimated click-through rate of the current half day and that of the last half day is less than 0.01, the click-through rate of the current half day is set as that of the last half day. In other words, small changes of the click-through rates are ignored between two consecutive half days. Therefore, a piecewise-stationary scenario is obtained with T=43200×10=4.32×10^5, K=6 and M=10.

Besides the M-UCB technique described herein, five other conventional algorithms are also described, which include Discounted UCB (D-UCB), Sliding-Window UCB (SWUCB), EXP3, EXP3.S and SHIFTBAND. Based on the theoretical results in (Garivier, Aurelian & Moulines, Eric, "On upper-confidence bound policies for non-stationary bandit problems" asXiv preprint arVix:0805.3415, 2008), $\gamma = 1 - 0.25\sqrt{((M-1)/T)}$ and $\xi = 0.5$ are chosen for D-UCB and $\tau = 2\sqrt{T \log T/(M-1)}$ in SW-UCB. The values δ+0.05, α=2 $\sqrt{\log(T^3 K/\delta)}$, β=1/T and $\eta = \sqrt{\log(TK)M/(TK)}$ are chosen for the SHIFTBAND algorithm. The expected cumulative regret is computed by taking the average of the regrets for one hundred independent Monte Carlo trials.

The results show that the M-UCB techniques achieve better performance than other algorithms even in instances in which each of the algorithms have a sub-linear regret. Compared with EXP3 and EXP3.S algorithm, M-UCB algorithm achieves a 50% reduction of the cumulative regret at the final stage, and the number is 60% in comparison to SW-UCB, D-UCB and SHIFTBAND algorithms. These experiment results suggest that, by adaptively detecting and quickly adapting to the changes, M-UCB techniques described herein achieve significant regret reductions compared with conventional techniques.

Example System and Device

Figure 6:
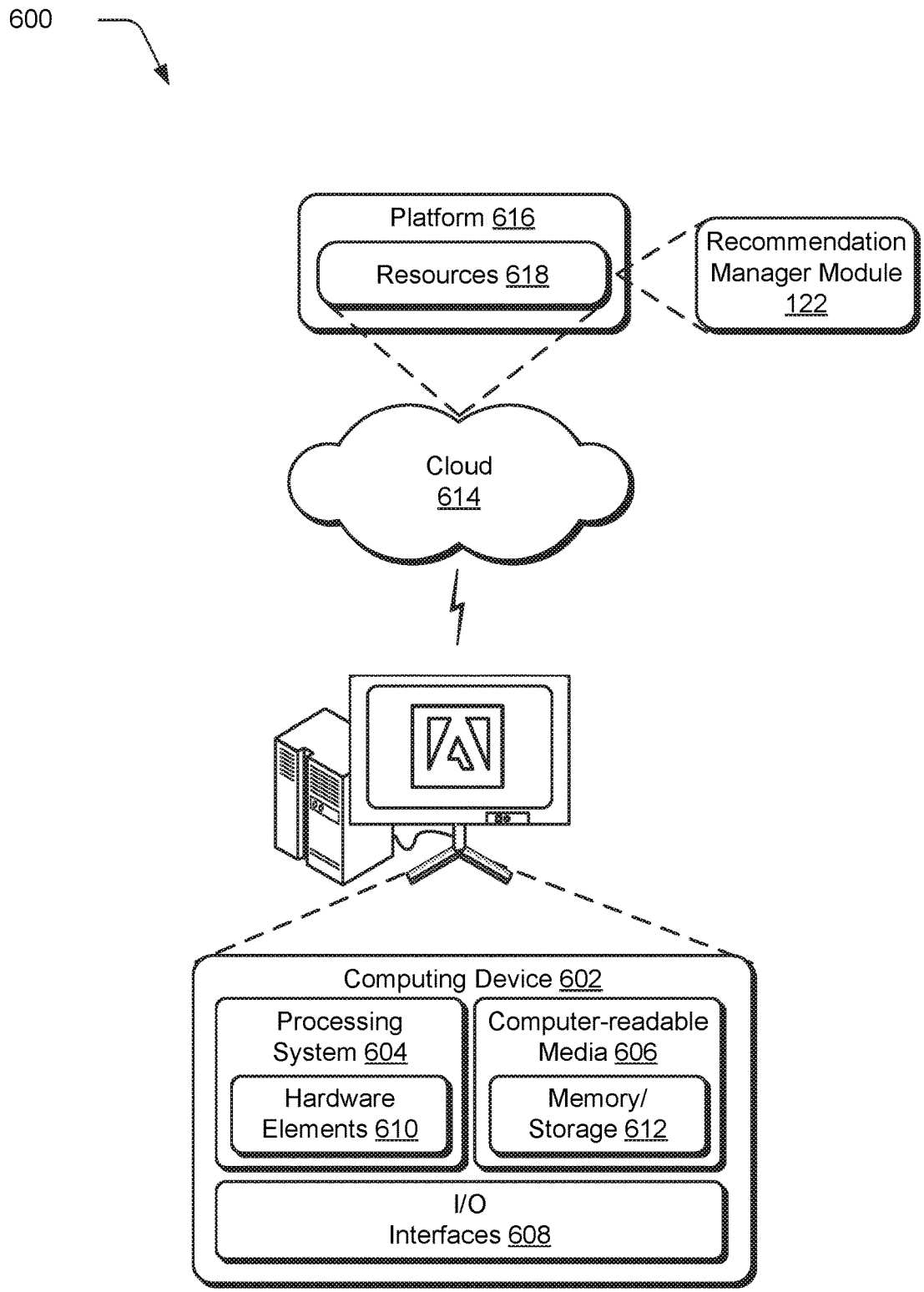
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the recommendation manager module 122. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium recommendation environment, a method implemented by at least one computing device, the method comprising:

forming, by the at least one computing device, a statistical model based on a first set of user interaction data, the statistical model describing a plurality of reward distributions for a plurality of digital content, respectively;

generating, by the at least one computing device, a digital content recommendation based on the statistical model;

allocating computational resources of the at least one computing device for distribution of the plurality of content based on the digital content recommendation;

receiving, by the at least one computing device, a second set of user interaction data that describes a result of the distribution of the plurality of content based on the digital content recommendation;

detecting, by the at least one computing device, a change point in user interaction with the recommendation based on the second set of user interaction data;

resetting, by the at least one computing device responsive to the detecting, the statistical model as adapting to the change point;

generating, by the at least one computing device, a subsequent digital content recommendation based on the reset statistical model for reward exploration of the plurality of digital content;

allocating the computational resources of the at least one computing device for distribution of the plurality of content based on the subsequent digital content recommendation; and controlling, by the at least one computing device, output of the plurality of digital content using the computational resources of the at least one computing device as allocated based on the subsequent digital content recommendation.

2. The method as described in claim 1, wherein the generating of the digital content recommendation is configured to maximize a reward over an amount of time.

3. The method as described in claim 2, wherein the generating of the digital content recommendation to maximize the reward over the amount of time includes determining whether to allocate the resources of the at least one computing device to perform:

exploration as increasing an amount of data gathered for each of the plurality of items of digital content as serving as a basis for digital content recommendation generation by the statistical model; or exploitation as learning an optimal item of digital content from the plurality of digital content as maximizing the reward as a basis for digital content recommendation generation by the statistical model.

4. The method as described in claim 3, wherein the exploration includes uniform sampling exploration and the exploitation includes an upper confidence bound (UCB) technique.

5. The method as described in claim 1, wherein the detecting of the change point by the at least one computing device is based on monitoring a mean of a respective said reward distribution for an item of digital content of the plurality of digital content that corresponds to the digital content recommendation.

6. The method as described in claim 1, wherein the detecting by the at least one computing device is based at least in part on determining, by the at least one computing device for an item of digital content of the plurality of digital content that corresponds to the digital content recommendation, that a reward distribution of the item of digital content based on the second set of user interaction data departs from a respective said reward distribution of the statistical model for the item of digital content by at least a threshold amount.

7. The method as described in claim 1, wherein the detecting by the at least one computing device is based on a regret bound calculated based on a number of time steps, a number of items of the plurality of digital content, and a number of stationary segments.

8. The method as described in claim 1, wherein the digital content recommendation identifies which items of the plurality of digital content are made available by the at least one computing device for consumption as a result of the allocating of the computational resources.

9. The method as described in claim 1, wherein the forming, the generating, and the receiving iterate over a plurality of time intervals and the detecting is performed for at least one of the time intervals.

10. In a digital medium recommendation environment, a system comprising:
a statistical model generation module implemented by a computing device to form a statistical model based on a first set of user interaction data, the statistical model describing a plurality of reward distributions for a plurality of digital content, respectively;
a recommendation generation module implemented by the computing device to generate a digital content recommendation based on the statistical model to maximize an overall reward over an amount of time based on exploitation and exploration of respective rewards of the plurality of digital content;
a change point detection module implemented by the computing device to:
detect a change point caused by the recommendation based on a second set of user interaction data; and
cause the statistical model generation module to reset the statistical model based on the detected change point, the reset statistical model causing the recommendation generation module to generate a subsequent digital content recommendation for reward exploration of the plurality of digital content; and
a digital content control module implemented by the computing device to allocate computational resources of the computing device to control distribution of the plurality of digital content based on the digital content recommendation and the subsequent digital content recommendation.

11. The system as described in claim 10, wherein the recommendation generation module is configured to generate the digital content recommendation based at least in part in determining whether to allocate the computational resources of the computing device to perform:
exploration as increasing an amount of data gathered for each of the plurality of items of digital content as serving as a basis for digital content recommendation generation by the statistical model; or
exploitation as learning an optimal item of digital content from the plurality of digital content as maximizing the overall reward as a basis for digital content recommendation generation by the statistical model.

12. The system as described in claim 11, wherein the exploration includes uniform sampling exploration and the exploitation includes an upper confidence bound (UCB) technique.

13. The system as described in claim 10, wherein the change point detection module is configured to detect the change point based on monitoring a mean of a respective said reward distribution for an item of digital content of the plurality of digital content that corresponds to the digital content recommendation.

14. The system as described in claim 10, wherein the change point detection module is configured to detect the change point based on determining, for an item of digital content of the plurality of digital content that corresponds to the digital content recommendation, that a reward distribution of the item of digital content based on the second set of user interaction data departs from a respective said reward distribution of the statistical model for item of digital content by at least a threshold amount.

15. The system as described in claim 10, wherein the change point detection module is configured to detect the change point based on a regret bound calculated based on a number of time steps, a number of items of the plurality of digital content, and a number of stationary segments.

16. In a digital medium recommendation environment, a system comprising:
means for forming a statistical model based on interaction data, the statistical model describing a plurality of reward distributions for a plurality of fixed resources, respectively;
means for generating a recommendation based on the statistical model;
means for allocating computational resources to control the plurality of fixed resources based on the recommendation;
means for detecting a change point caused by the distribution of the fixed resource based on the recommendation;
means for resetting the statistical model as adapting to the change point;
means for generating a subsequent recommendation based on the reset statistical model for reward exploration;
means for allocating computational resources to control the plurality of fixed resources based on the subsequent recommendation; and
means for controlling the plurality of fixed resources based on the subsequent recommendation .

17. The system as described in claim 16, wherein the reset statistical model is configured for reward exploration of the plurality of fixed resources.

18. The system as described in claim 16, wherein the generating means is configured to generate the recommendation to maximize a reward over an amount of time.

19. The system as described in claim 18, wherein the generating means is configured to generate the digital content recommendation to maximize a reward over an amount of time by determining whether to perform:
exploration as increasing an amount of data gathered for each of the plurality of fixed resources as serving as a basis for recommendation generation by the statistical model; or
exploitation as learning an optimal fixed resource from the plurality of fixed resources as maximizing the reward as a basis for recommendation generation by the statistical model.

20. The system as described in claim 19, wherein the exploration includes uniform sampling exploration and the exploitation includes an upper confidence bound (UCB) technique.

* * * * *